(12) United States Patent
Aldibi et al.

(10) Patent No.: US 7,001,789 B2
(45) Date of Patent: Feb. 21, 2006

(54) METHOD FOR FABRICATING A TAPERED OPTICAL COUPLING INTO A SLAB WAVEGUIDE

(75) Inventors: Ali Aldibi, Atlanta, GA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/134,008

(22) Filed: May 20, 2005

(65) Prior Publication Data

US 2005/0213884 A1    Sep. 29, 2005

Related U.S. Application Data

(62) Division of application No. 10/050,513, filed on Jan. 16, 2002, now abandoned.

(51) Int. Cl.
    *H01L 21/00*    (2006.01)
(52) U.S. Cl. .......................... 438/31; 438/701

(58) Field of Classification Search ................... 438/31, 438/694–703
See application file for complete search history.

(56) References Cited

U.S. PATENT DOCUMENTS 6,468,823 B1 * 10/2002 Scherer et al. ............. 438/31

* cited by examiner

*Primary Examiner*—H. Jey Tsai
(74) *Attorney, Agent, or Firm*—Daniel L. Dawes; Myers Dawes Andras & Sherman

(57) ABSTRACT

A three dimensional adiabatic taper provides a funnel for light to be coupled into high index material. The taper is formed by shadow deposition or sputtering from polysilicon, which can be used to match the refractive index of waveguiding material to which the taper is optically coupled. When designed with the correct shape and adequate smoothness, such tapers form efficient waveguide couplers. Once the light has been coupled through the adiabatic coupler into an index guide on a wafer or chip, an integral design of the transition between the index guide and photonic crystal ensures low loss coupling with a minimum of diffraction and back reflection.

20 Claims, 4 Drawing Sheets

METHOD FOR FABRICATING A TAPERED OPTICAL COUPLING INTO A SLAB WAVEGUIDE

The application is a divisional patent application of and claims priority to U.S. application Ser. No. 10/050,513 filed Jan. 16, 2002, now abnd.

BACKGROUND OF THE INVENTION

1. Field of the Invention

The invention relates to the field of photonics and in particular to tapered dielectric slab waveguides for input and output coupling of light into photonic crystal devices.

2. Description of the Prior Art

Photonic crystals are very advantageous for use in small optical devices. Recently, it has become possible to microfabricate high reflectivity mirrors by creating two- and three-dimensional periodic structures. These periodic "photonic crystals" can be designed to open up frequency bands within which the propagation of electromagnetic waves is forbidden irrespective of the propagation direction in space and to define photonic bandgaps. When combined with high index contrast slabs in which light can be efficiently guided, microfabricated two-dimensional photonic bandgap mirrors provide the geometries needed to confine light into extremely small volumes.

For example, two dimensional Fabry-Perot resonators with microfabricated mirrors are formed when defects are introduced into the photonic bandgap structure. It is then possible to tune these cavities lithographically by changing the precise geometry of the microstructures surrounding the defects. By using the same microfabrication techniques, it is also possible to guide, bend, filter and sort light in two dimensional photonic crystals. For example, by introducing line defects, photonic crystal waveguides can be constructed, and light can be guided around sharp corners without the normally associated bend losses.

Although photonic crystal devices show promise for future optical devices, the coupling of light into and out of the optical devices made from photonic crystals has been inefficient. This is due to the very small size of these devices (typically 0.2 $\mu$m) compared to the size of the input beam (for example, from an optical fiber) and the size of the output device (for example, also an optical fiber). While the typical thickness of a photonic crystal waveguide is about 0.2 $\mu$m, the smallest size of the light beam normally coupled into such a photonic crystal waveguides is around 1.0 $\mu$m. This results in a large insertion loss.

What is needed is some means whereby such insertion losses can be avoided or minimized.

BRIEF SUMMARY OF THE INVENTION

One of the key limitations of planar waveguides formed from high refractive index material is the poor mode-matching between such waveguides and optical fibers. This leads to large insertion losses when light is to be coupled onto and off the chip, even when the fiber pigtails are perfectly aligned. Single mode fiber cores are typically 6 microns in diameter, whereas the typical dimensions of silicon waveguides are about 0.3 microns. Even if focusing optics is employed, the diffraction limited spot size is still substantially larger than the cross section of a single mode high index waveguide.

One approach to reducing the mode-matching difficulties may again be borrowed from the microwave technologies, and lies in the form of an adiabatic taper. Such a taper, when constructed, may provide a funnel for light to be coupled into the high index material, and must be three dimensional in nature. Of course, this provides a fabrication challenge, since while it is easy in most planar processing protocols to define a lateral taper through lithography, the change in height of the waveguide is a much more difficult task. Fortunately, it is possible by shadow deposition or sputtering to form such tapers from polysilicon, which can be used to match the refractive index of the waveguiding material. When designed with the correct shape and adequate smoothness, such tapers form efficient waveguide couplers. Once the light has been coupled through the adiabatic coupler into an index guide on a wafer or chip, proper design of the transition between the index guide and photonic crystal is necessary to ensure low loss coupling with a minimum of diffraction and back reflection.

The invention is thus defined as a method for fabricating a tapered optical coupling into a slab waveguide comprising the steps of providing a sputtering source; providing at least one mask between the source and the mask; and disposing a tapered layer of material onto a substrate, which includes a waveguiding layer by means of shadow deposition defined by the sputtering source and the at least one mask. The tapered layer extends in a first two dimensional plane and is optically coupled to the waveguiding layer. A second taper is photolithographically defined in the tapered layer. The second taper extends in a second two dimensional plane and intersects the first two dimensional plane.

The step of photolithographically defining a second taper in the tapered layer defines the second two dimensional plane so as to perpendicularly intersect the first two dimensional plane.

The method further comprises photolithographically defining a slab waveguide in the waveguiding layer simultaneously with photolithographically defining a second taper in the tapered layer.

The method further comprises coupling the slab waveguide to a photonic crystal. Coupling the slab waveguide to the photonic crystal comprises forming the slab waveguide integrally with the photonic crystal.

The step of disposing the tapered layer of material onto the substrate comprises disposing the tapered layer by means of shadow deposition defined by the sputtering source and the at least two masks.

The step of disposing the tapered layer of material onto the substrate comprises disposing polycrystalline silicon.

The step of disposing the tapered layer of material onto the substrate comprises disposing a material with an approximately matching refractive index to the waveguiding layer.

The method further comprises repeating the method on an opposing side of the substrate to form another tapered optical coupling on the opposing side aligned with the tapered optical coupling.

The method further comprises first forming a tapered substrate by means of shadow deposition and then forming the tapered optical coupling on the tapered substrate to obtain a fully flared, funnel-shaped, optical coupling.

The invention is also a tapered optical coupling comprising a substrate; a slab waveguide on or in the substrate, and a funnel-shaped termination on or in the substrate and optically coupled to the slab waveguide.

The apparatus further comprises a photonic crystal. The photonic crystal is optically coupled to the slab waveguide. The slab waveguide is integral with the photonic crystal.

The apparatus further comprises an optic fiber and the funnel-shaped termination is optically coupled to the optic fiber. The funnel-shaped termination is formed by shadow deposition.

The funnel-shaped termination is composed of material having an index of refraction approximately matching the slab waveguide. In one embodiment the funnel-shaped termination is composed of polycrystalline silicon and the slab waveguide is composed of GaAs.

The funnel-shaped termination is a half-funnel shape or a full-funnel shape. The funnel-shaped termination comprises a surface for optical coupling inclined with respect to the substrate.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
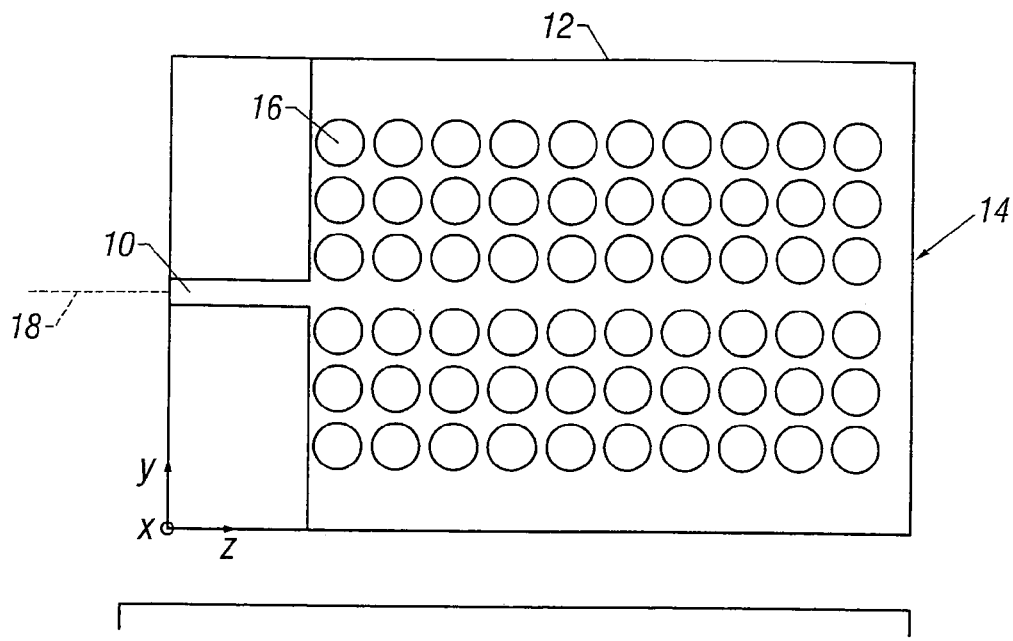
FIG. 1 is a diagrammatic top plan view of the coupling of a dielectric slab waveguide to a photonic crystal waveguide.

The invention is an apparatus whereby the insertion loss from a source of light, such as an optic fiber, into a photonic crystal is reduced by use of a tapered dielectric slab waveguides at both input and output ports of a photonic device. Dielectric slab waveguides 10 can be efficiently coupled to photonic crystal waveguides 12. FIG. 1 is a diagrammatic top plan view, which illustrates one way in which this coupling is performed, and FIG. 2 is a graph of the power transmission spectrum (ratio of the transmitted to the incident power at different frequencies) for a coupling of the design of FIG. 1.

Slab waveguide 10 is a parallelepiped of conventional photonic material defining a longitudinal axis 18 and having an homogenous or heterogeneous structure which integrally extends into or out of the body of photonic crystal 12. In the illustrated embodiment shown in FIG. 1 slab waveguide 10 effectively extends into photonic crystal 12 bisecting the periodic hole pattern, generally denoted by reference numeral 14. The longitudinal axis of slab waveguide 10 is parallel with the direction of the rows of holes 16 in pattern 14. The longitudinal axis of holes 16 are perpendicular to the longitudinal axis 18 of slab waveguide 10. The optical properties of slab waveguide 10 and crystal 12 are chosen according to well understood principles to optimize the matching therebetween and hence the launch of the optical wave in slab waveguide 10 efficiently into the waveguide structure of photonic crystal 12. Many different types of geometries and topologies of slab waveguide 10 and crystal 12 can be employed, which are equivalent in their coupling efficiencies to the illustrated embodiment and hence are to be understood as being within the scope of the teachings of the invention.

Figure 2:
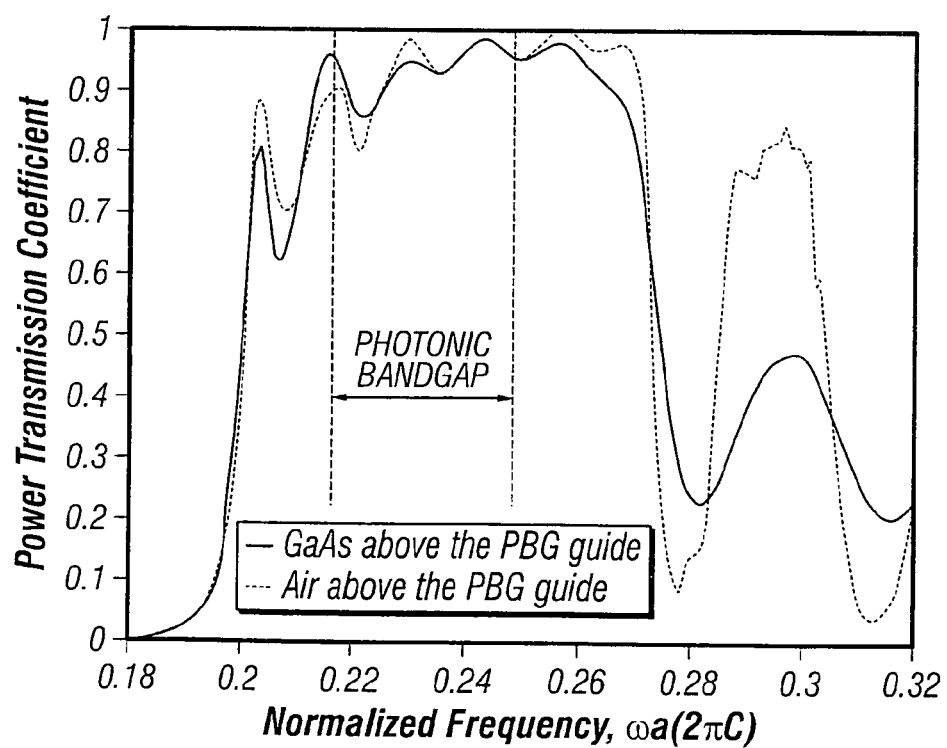
FIG. 2 is a graph of the power transmission coefficient as a function of frequency for the coupling of FIG. 1.

FIG. 2 shows the dependence of the power transmission coefficient as a function of normalized frequency. As FIG. 2 shows, it is possible to obtain efficient coupling from a slab waveguide 10 into a photonic crystal waveguide 12 (and vice versa) over a relatively wide frequency range. A major advantage of using dielectric slab waveguides 12 are their simplicity and the fact that these waveguides have been used for a long time in integrated optics. Therefore, the technology needed for the optimization of their properties is widely available and well worked out.

By using the dielectric slab waveguides for input and output coupling of the photonic crystal devices, what is needed then is some means to improve the insertion loss into and out of a dielectric slab waveguide. While the slab-to-photonic waveguide coupling can be high, slab waveguide 10 is similar in size to the photonic crystal 12 itself, so that insertion of light efficiently into slab waveguide 10 from a macroscopic source, such as a fiber optic, remains to be solved. The light must be coupled from the dielectric slab waveguide 10 to the photonic crystal waveguide 12 that is in turn coupled to other photonic crystal devices.

Figure 3:
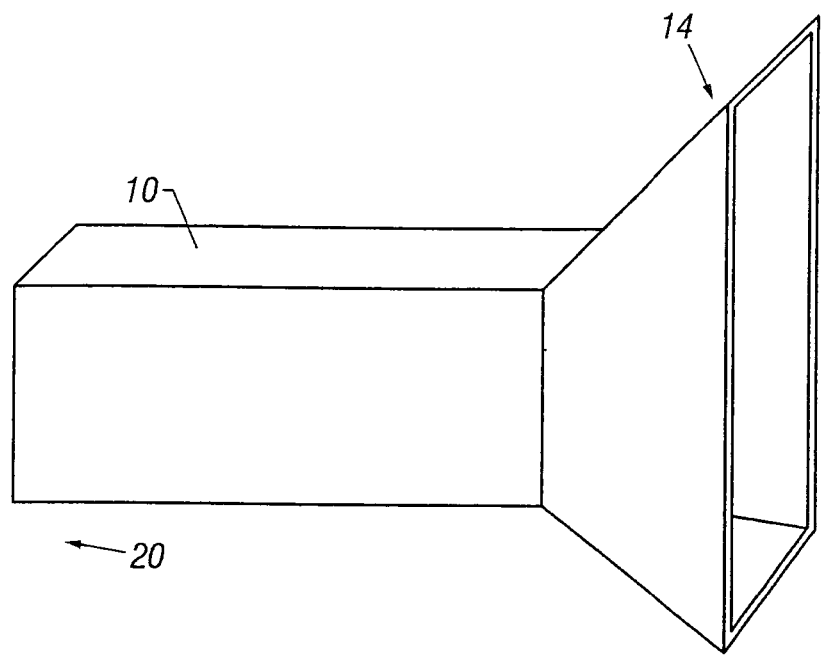
FIG. 3 is a perspective view of a linearly tapered dielectric waveguide in which the direction of the wave propagation is defined as the z-axis and in which there is tapering in both the x-z and y-z planes.
Figure 4A:
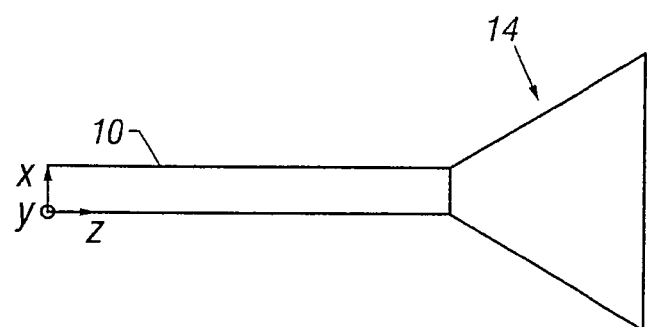
FIG. 4a is a diagrammatic plan view of the tapering of the waveguide of FIG. 3 in the x-z plane.
Figure 4B:
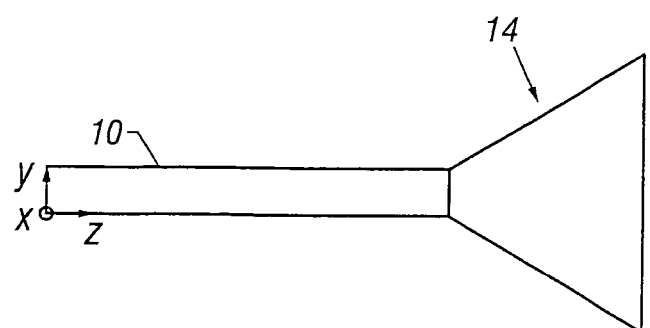
FIG. 4b is a diagrammatic plan view of the tapering of the waveguide of FIG. 3 in the y-z plane.

To reduce the insertion loss into the dielectric slab waveguide 10, we use a slowly tapered waveguide 14 at both the input and output of a slab waveguide 10 as shown in FIGS. 3, 4a and 4b. The idea of slowly tapering the guiding structure to increase the mode size, while keeping the single-mode propagation in the slab waveguide 10 has been used in frequency regimes different than the optical frequencies. For example, horn antennas in the microwave regime are provided by slowly tapering a rectangular metallic waveguide. Due to the scaling property of the Maxwell's equations, similar ideas function similarly in the optical regime. Therefore, the efficiency of the coupling of a large beam to a dielectric slab waveguide 10 is improved by slowly tapering the waveguide 10 in the propagation direction 20 or the longitudinal axis of waveguide 10 as shown in FIG. 3. As FIG. 3 shows, the tapering is performed both in the x-z and in the y-z planes, with z being the direction of propagation, just as in a microwave horn antenna or coupling.

The challenge, however, is how to make such a tapered waveguide 14 in both x-z and y-z planes in microphotonic materials and scales. We can certainly taper the waveguide 14 in one plane (for example x-z plane in FIG. 3) by conventional planar lithography. However, we cannot taper the waveguide 14 in the other plane (y-z plane in FIG. 3) by conventional planar lithography. FIG. 4a shows the plan view of tapered waveguide 14 of FIG. 3 in the x-z plane and FIG. 4b shows the plan view of tapered waveguide 14 of FIG. 3 in the y-z plane.

This tapering is performed according to the invention by the use a Si sputtering source and an appropriately designed shadow mask or masks 22 as described in greater detail below in connection with FIGS. 5a–5c. Although a sputtering source is described in the illustrated embodiment, any other source of material which is capable of projecting a shadow from the sharp edge of a mask may be equivalently substituted. Therefore, for simplicity, a "sputtering source" shall be defined in this specification and claim to include not only true sputtering sources, but all sources capable of casting a shadow of disposed material. Due to the presence of the shadow mask 22, the Si that is sputtered onto the waveguide layer has a different thickness at different locations. The tapering, i.e., the variation of the waveguide thickness (in y-z plane in FIG. 3), can be controlled by changing the shape and the placement of the shadow mask. Conventional ray tracing of the mask and source geometry can be used to accurately predict the shape of the sputtered shadow layer formed. Therefore, we can taper the waveguide in the vertical plane (y-z in FIG. 3) using this technique. Then, we can taper the waveguide in the horizontal plane (x-z plane in FIG. 3) by conventional planar lithography so that the tapering in the two planes have similar properties. Using this idea, we the insertion loss is considerably improved.

Figure 5A:
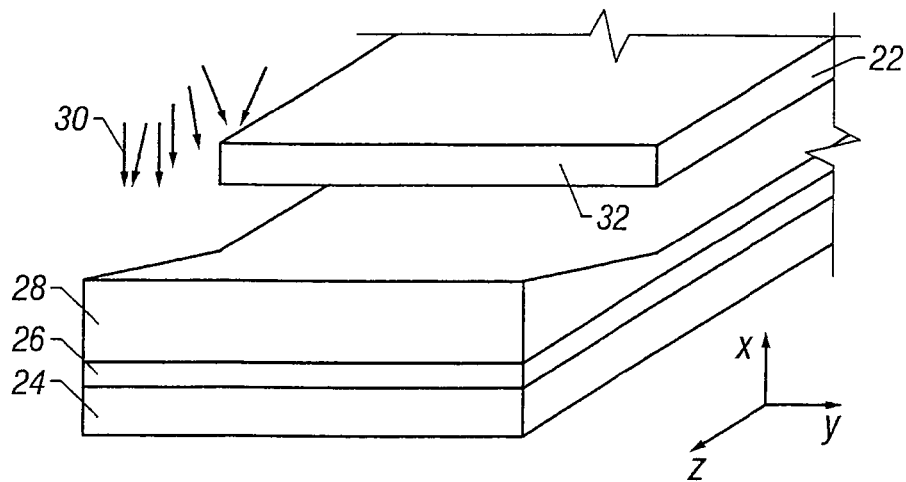
FIGS. 5a and 5b are diagrammatic perspective views of the method of microfabricating a tapered waveguide coupling as shown in FIGS. 3, 4a and 4b.
Figure 5B:
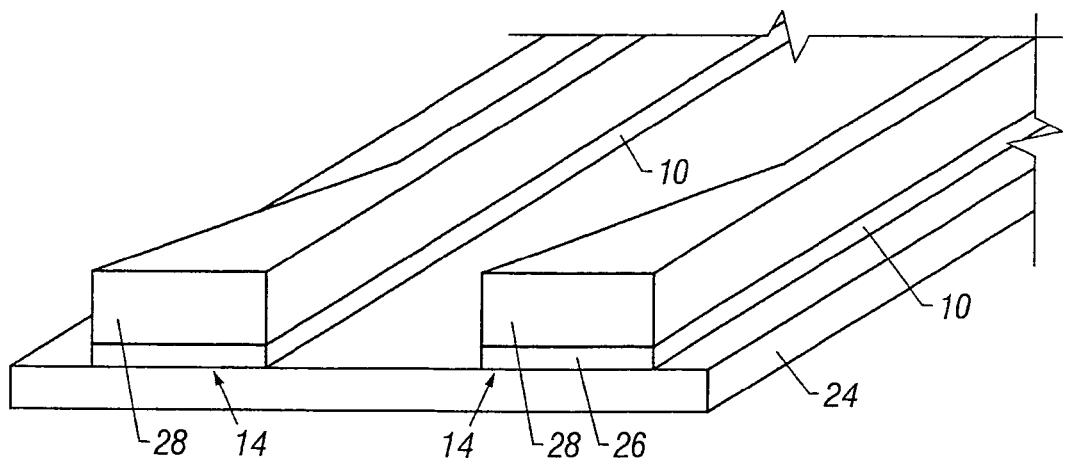

Reference to FIGS. 5a and 5b will make the methodology of the invention clearer. A dielectric waveguide layer 26 is formed in a conventional manner on substrate 24. Thereafter, mask 22 is positioned appropriately between the sputtering source, which is diagrammatically depicted by arrows 30, and layer 26. Mask 22 creates a sputtering shadow layer 28 beyond its edge 32 onto layer 26, which thickens as the distance of edge 32 increases. Additional planar layers could be formed on shadow layer 28 if desired, for example a cladding or passivating layer if desired. Conventional planar lithography is then used as shown in FIG. 5b to define tapered waveguide 14 and slab waveguide 10 on substrate 24. Shadow sputtering defines the degree of tapering in the x-z plane in FIGS. 5a and 5b, while conventional planar lithography defines the same or a different degree of tapering in the y-z plane.

For example, if we want to couple a Gaussian beam of light with beam waist of $\omega_o=1$ $\mu$m into a dielectric slab waveguide 10 with the slab cross section of 0.2 $\mu$m by 0.2 $\mu$m. We can improve the insertion loss (at one side) by at least 3 dB, if we use a tapered slab waveguide 14 as explained above.

Note that this idea can also be applied to the structures made from other materials than Si (for example, GaAs). We can taper the waveguide in the vertical plane by Si sputtering, and the taper in the horizontal plane by lithography as explained before. The index of refraction of Si is close enough to that of GaAs to result into an acceptable loss due to index mismatch.

Many alterations and modifications may be made by those having ordinary skill in the art without departing from the spirit and scope of the invention. For example, substrate 24 is shown in FIGS. 5a and 5b as a planar slab. It is also possible that substrate 24 may itself be tapered. By the same shadow deposition the material of substrate 24 may be provided with a reversely oriented taper so that when the Si is sputtered in FIG. 5a, it is laid down on a substrate surface, which falls away from a plane parallel to the plane of mask 22 instead of onto a parallel planar opposing surface. In this way it is possible to create a taper both into and out of the plane of substrate 24 to provide a full or symmetric funnel shape to the coupling as shown in FIG. 3 rather than the half-funnel shape shown in FIGS. 5a and 5b.

Alternatively, a half-funnel can be formed on one side of substrate 24 and then an aligned and corresponding half-funnel defined on the opposing side of substrate 24 to provide a full funnel-shaped coupling with substrate 24 sandwiched in between and including a preformed slab waveguide therein aligned with the two half-funnels, one on each side of the preformed waveguide.

The illustrated embodiment has shown mask 22 as planar, but it must be understood that mask 22 may be a surface of arbitrary curvature, which is dictated by the shape of the shadow desired, which in turn may have an arbitrary curvature. Thus, complex and arbitrarily shaped tapers are possible with the methodology of the invention.

Figure 6:
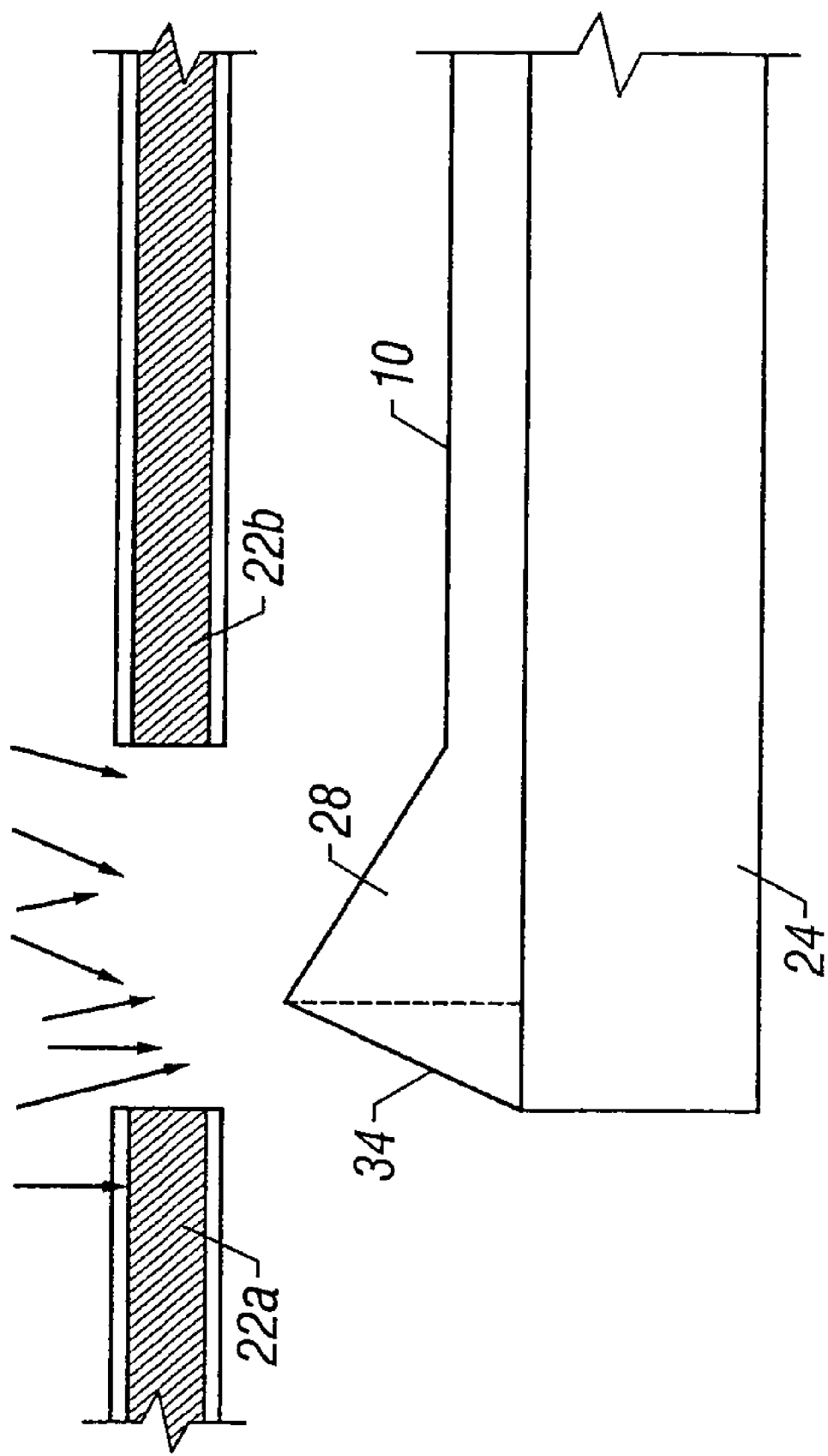
FIG. 6 is a diagrammatic side view of an embodiment where two shadow masks are employed in order to provide an inclined face to the end of the tapered waveguide.

Still further multiple masks 22a and 22b may be used in combination to create compound tapered shapes. In FIG. 6 for example the coupling of FIG. 5b is created using mask 22b while at the same time mask 22a is used to create a reverse taper 34 to the terminal end of tapered waveguide 14. Such a reverse taper 34 can be advantageously used to couple an angled optic fiber to waveguide 14 if access in the plane of substrate 24 is for any reason difficult or undesirable.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for fabricating a tapered optical coupling into a slab waveguide comprising:
   providing a sputtering source;
   providing at least one mask between said source and said mask;
   disposing a tapered layer of material onto a substrate which includes a waveguiding layer having a plurality of holes by means of a three dimensional funnel-shaped shadow deposition defined by said sputtering source and said at least one mask, said tapered layer extending in a first two dimensional plane and optically coupled to said waveguiding layer; and
   photolithographically defining a second taper in said tapered layer, said second taper extending in a second two dimensional plane intersecting said first two dimensional plane, whereby shadow deposition tapers in two different dimensions.

2. The method of claim 1 where photolithographically defining a second taper in said tapered layer defines said second two dimensional plane so as to perpendicularly intersect said first two dimensional plane.

3. The method of claim 1 further comprising photolithographically defining a slab waveguide in said waveguiding layer simultaneously with photolithographically defining a second taper in said tapered layer.

4. The method of claim 3 further comprising coupling said slab waveguide to a photonic crystal.

5. The method of claim 4 where coupling said slab waveguide to said photonic crystal comprises forming said slab waveguide integrally with said photonic crystal.

6. The method of claim 1 where disposing said tapered layer of material onto said substrate comprises disposing said tapered layer by means of shadow deposition defined by said sputtering source and said at least two masks.

7. The method of claim 1 where disposing said tapered layer of material onto said substrate comprises disposing polycrystalline silicon.

8. The method of claim 1 where disposing said tapered layer of material onto said substrate comprises disposing a material with an approximately matching refractive index to said waveguiding layer.

9. The method of claim 1 further comprising repeating said method on an opposing side of said substrate to form another tapered optical coupling on said opposing side aligned with said tapered optical coupling.

10. The method of claim 1 further comprising first forming a tapered substrate by means of shadow deposition and then forming said tapered optical coupling on said tapered substrate to obtain a fully flared, funnel-shaped, optical coupling.

11. A method for fabricating a tapered optical coupling into a slab waveguide comprising:
    disposing material from which the optical coupling will be comprised onto a substrate, which includes a waveguiding layer, by means of a shadow mask interposed between a sputtering source of the material and the substrate, a taper of the thickness of the disposed material on the substrate defined by the combination of the sputtering source and shadow mask extending in a first direction; and
    photolithographically defining a second taper in the disposed material on the substrate, the second taper extending in a second direction intersecting the first direction, whereby the tapered optical coupling assume a shape with a taper in two different directions.

12. The method of claim 11 where photolithographically defining a second taper defines a taper extending in the second direction which is perpendicular to the first direction.

13. The method of claim 11 further comprising photolithographically defining a slab waveguide in the waveguiding layer simultaneously with photolithographically defining a second taper.

14. The method of claim 13 further comprising coupling the slab waveguide to a photonic crystal.

15. The method of claim 14 where coupling the slab waveguide to the photonic crystal comprises forming the slab waveguide integrally with the photonic crystal.

16. The method of claim 11 where disposing the material onto the substrate comprises disposing the material by means of shadow deposition defined by the sputtering source and at least two shadow masks.

17. The method of claim 11 where disposing the material onto the substrate comprises disposing polycrystalline silicon.

18. The method of claim 11 where disposing the material onto the substrate comprises disposing a material with an approximately matching refractive index to the waveguiding layer.

19. The method of claim 11 further comprising repeating the method on an opposing side of the substrate to form another tapered optical coupling on the opposing side aligned with the tapered optical coupling.

20. The method of claim 11 further comprising first forming a tapered substrate by means of shadow deposition and then forming the tapered optical coupling on the tapered substrate to obtain a fully flared, funnel-shaped, optical coupling.

* * * * *